June 7, 1960  T. H. McDONALD ET AL  2,939,771
CONTACT APPARATUS INCLUDING SEALING MEANS
Filed July 29, 1958  4 Sheets-Sheet 1
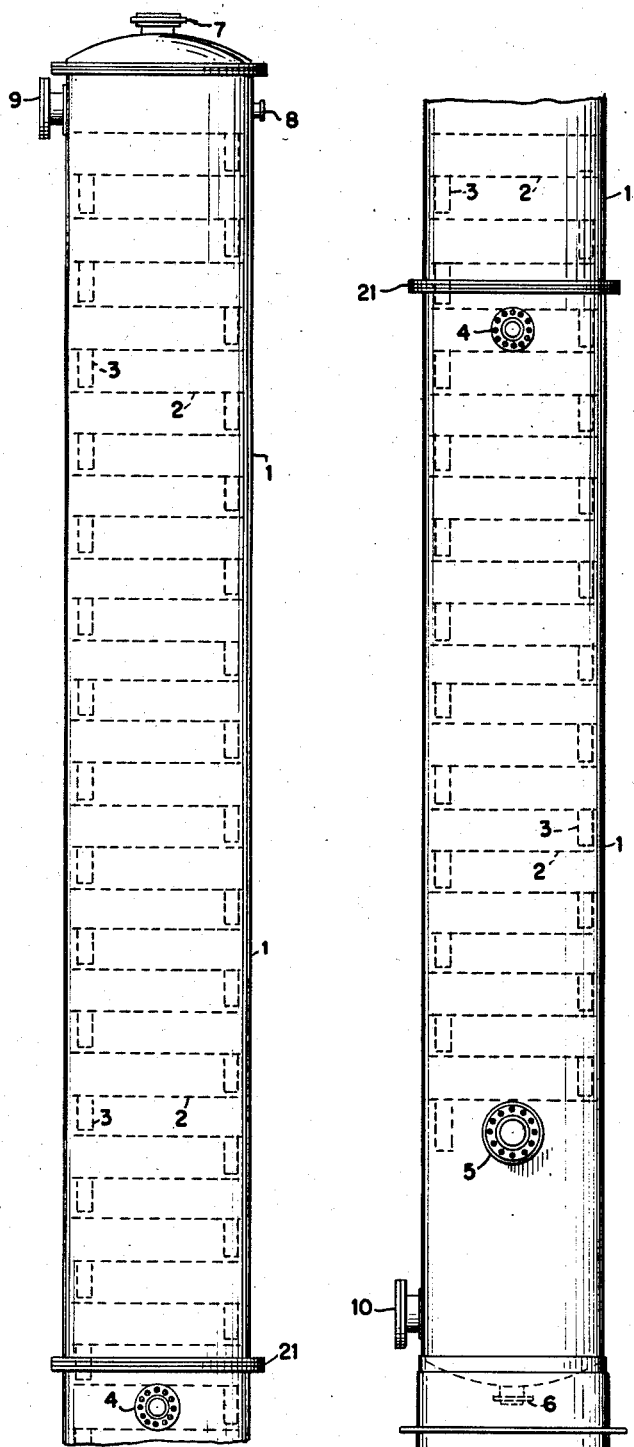
FIG. I
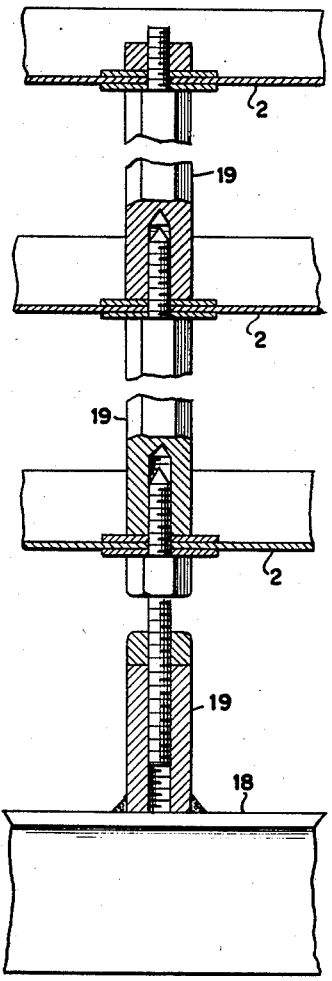
FIG. 8
INVENTORS
Thomas H. McDonald
Raymond E. Dennis
BY
Adams, Forward & McLean
ATTORNEYS June 7, 1960

T. H. McDONALD ET AL 2,939,771

CONTACT APPARATUS INCLUDING SEALING MEANS

Filed July 29, 1958

INVENTORS
Thomas H. McDonald
Raymond E. Dennis
BY

ATTORNEYS

June 7, 1960   T. H. McDONALD ET AL   2,939,771
CONTACT APPARATUS INCLUDING SEALING MEANS
Filed July 29, 1958   4 Sheets-Sheet 3

INVENTORS
Thomas H. McDonald
BY Raymond E. Dennis

Adams, Forward and McLean
ATTORNEYS

June 7, 1960   T. H. McDONALD ET AL   2,939,771
CONTACT APPARATUS INCLUDING SEALING MEANS
Filed July 29, 1958   4 Sheets-Sheet 4
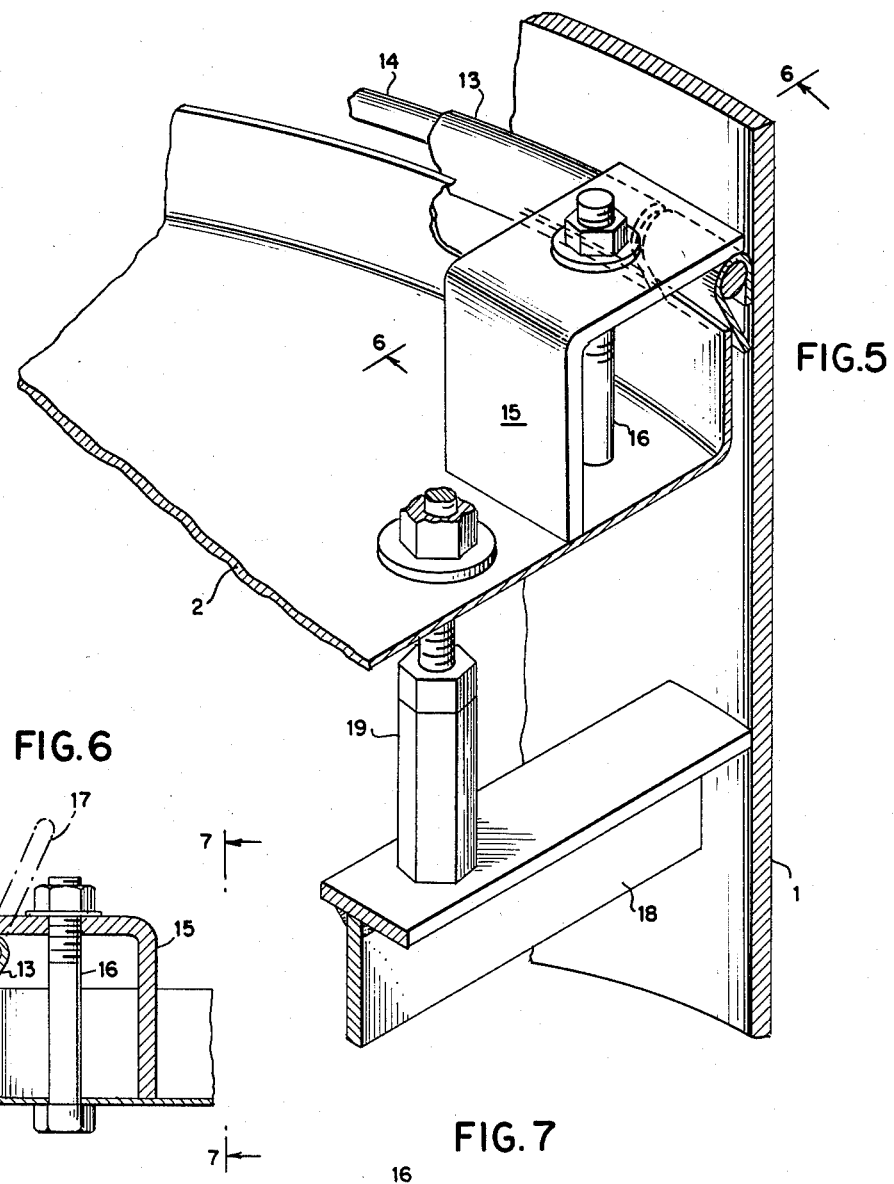
INVENTORS
Thomas H. McDonald
Raymond E. Dennis
BY
Adams, Forward and McLean
ATTORNEYS

United States Patent Office 2,939,771
Patented June 7, 1960

2,939,771
CONTACT APPARATUS INCLUDING SEALING MEANS

Thomas H. McDonald, Terrace Park, and Raymond E. Dennis, Cincinnati, Ohio, assignors to Vulcan-Cincinnati, Inc., Cincinnati, Ohio, a corporation of Ohio Filed July 29, 1958, Ser. No. 751,665

2 Claims. (Cl. 23—283)

This invention relates to an improvement in contact apparatus, particularly columns or vessels provided with a plurality of plates. More particularly, this invention relates to an improved type of construction which is adapted to prevent the passage of material between the vessel and the plates.

A great many operations are carried out in the process industries which have as their object the passage of material from one phase to another. One such operation which is very common is distillation or rectification, such an operation being widely used in petroleum refining and in a variety of chemical operations to separate mixtures. A second such operation is selective absorption, which involves the treatment of a gas by a liquid. Examples of this type of operation are the treatment of coal gas with water to remove ammonia, the removal of benzene, toluene or xylene from coal gas using absorbent oils, the removal of gasoline from natural gas by the use of absorbent oils, the removal of sulfur dioxide from smelter gases by the use of water, the removal of carbon dioxide from flue gases using aqueous solutions of alkali carbonates, and the like. A third type of operation involves the treatment of a liquid by a gas, as in the removal of benzene from admixture with absorbent oil by stripping with steam. A fourth such operation involves the treatment of a liquid with another liquid as in the removal of certain solutes from aqueous solution by treatment with organic solvents, the removal of aromatic compounds from hydrocarbon mixtures by treatment with liquid sulfur dioxide, and so forth.

All of the foregoing operations involve the transfer of mass or material from one phase to a different phase. As a general rule, such transfer cannot be carried out to the desired extent in a single separation step, since equilibrium conditions represent the greatest degree of separation which can be obtained in a single step and the degree of separation represented by equilibrium conditions may not be as great as that desired. Moreover, in a single separation step, in order for equilibrium conditions to be approached, intimate contact must be obtained between the phases from one of which it is desired to transfer material to the other. To obtain the desired results in view of the limitations imposed by equilibrium conditions and the requirement of intimate contact, the art has turned to operations involving multiple separation steps in each of which an attempt is made to approach equilibrium conditions as closely as practicable by providing intimate contact in each separation step. Intimate contact has been obtained by the use of plates provided with bubble caps, by the use of plates perforated with holes, and by the use of plates in the form of sieves and the like, and a plurality of such plates horizontally positioned one above the other in columns or vessels has been used to provide multiple separation steps.

It is desirable that a column provided with a plurality of plates be conveniently dismantled in the event that operating difficulties are encountered after the column has been put into operation. This means that the plates cannot be permanently affixed to the column shell, as by welding. Welding is also disadvantageous in that it tends to result in warping and also tends to make the equipment more subject to attack by corrosive agents. If the plates are not permanently fixed to the column, means must be provided to prevent material from by-passing a plate by flowing through the space between the plate and the shell of the column, or otherwise the intimate contact designed to approach equilibrium conditions at the plate will not exist. The present invention provides a sealing means for preventing such by-passing, so that the intimate contact desired is obtained at the plate.

For an understanding of the means whereby the object of this invention is obtained, reference is made to the accompanying drawings which show an embodiment falling within the broad scope of this invention and in which:

Fig. 1 is an elevation of a distillation column, broken in two to save space in the drawing;

Fig. 5 is a detail of the sealing device of the present invention;

Fig. 6 is a vertical section taken along the line 6—6 of Fig. 5;

Fig. 7 is a side elevation taken in the direction 7—7 of Fig. 6;

Fig. 8 is a detailed showing of the means provided in the column for supporting the various plates.

Figure 2:
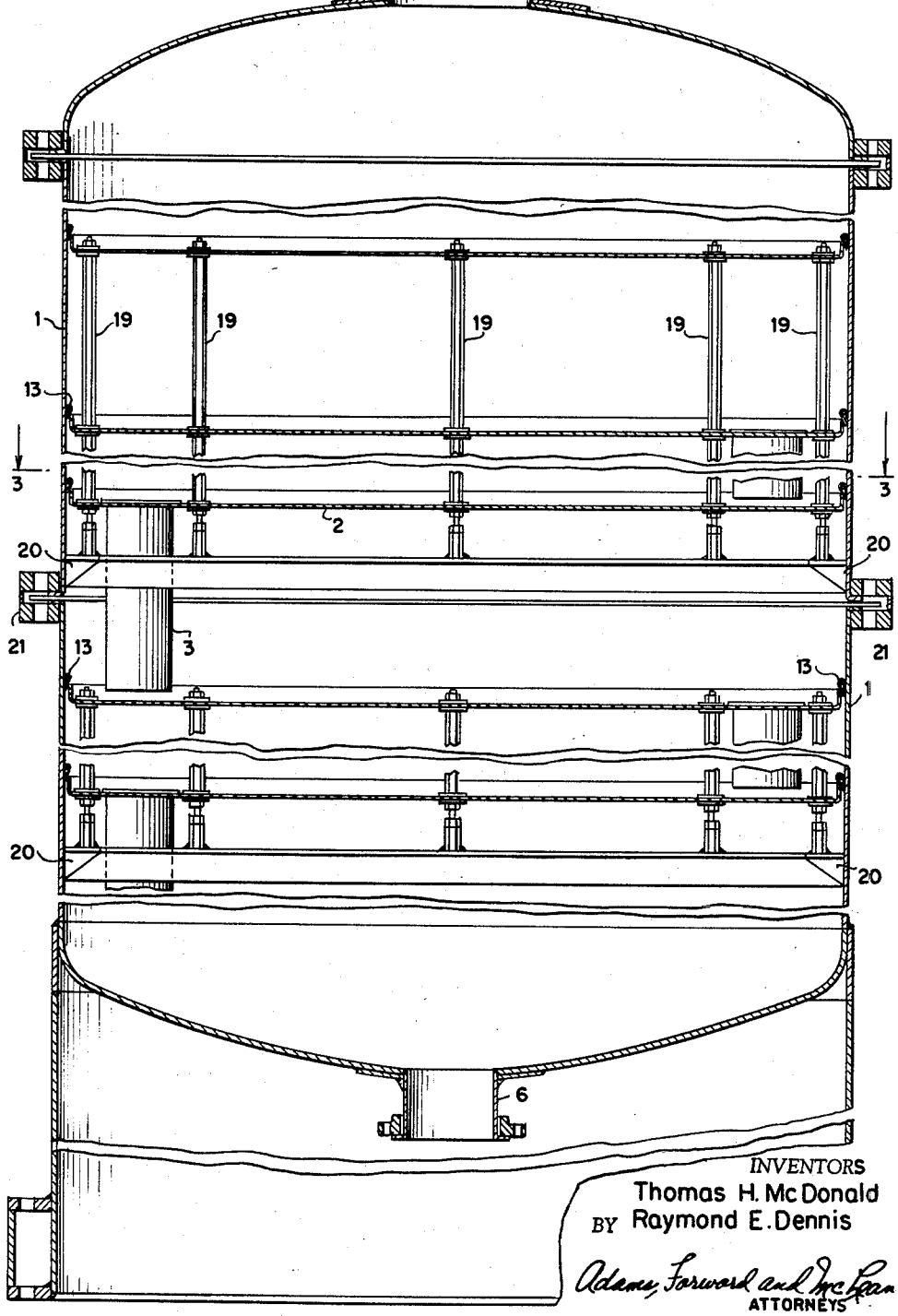
Fig. 2 is a vertical section through the center of Fig. 1 with certain parts broken out.

Referring to Fig. 1 and Fig. 2, the numeral 1 represents the shell of a distillation column provided with 50 perforated plates 2 and conventional downcomers 3. The shell is also provided with inlet 4 for the introduction of product to be distilled, steam inlet 5 for the introduction of steam to assist in the distillation, liquid outlet 6, vapor outlet 7 and reflux inlet 8 for the introduction of liquid to maintain proper operation conditions. The numerals 9 and 10 represent manholes.

Figure 3:
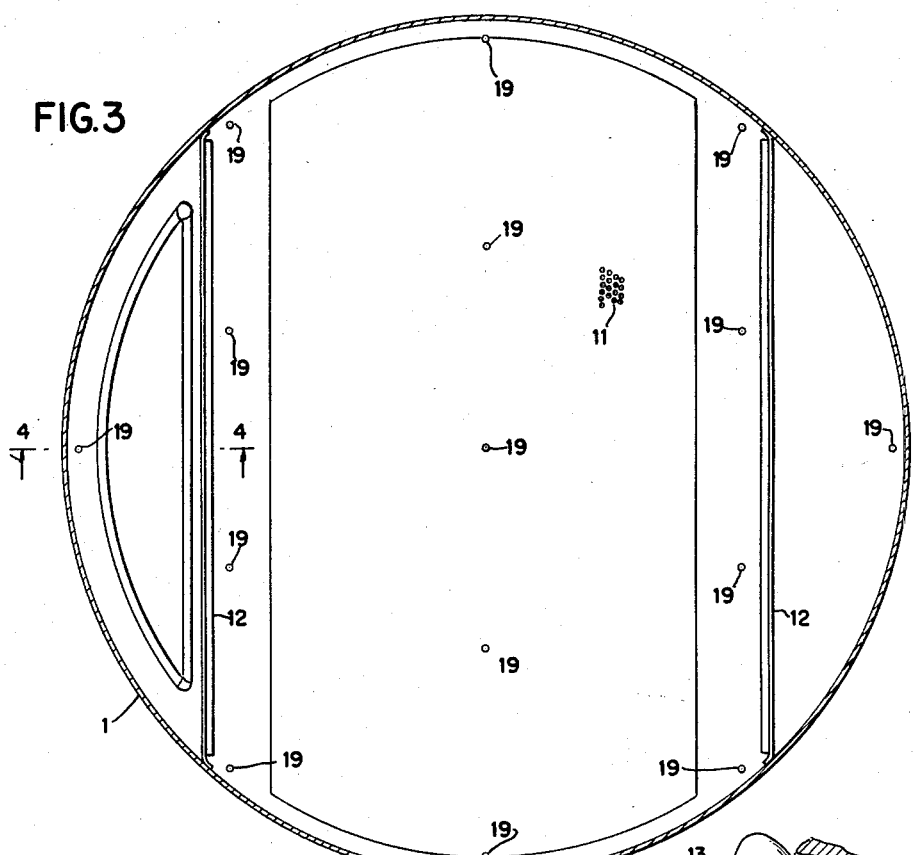
Fig. 3 is a horizontal section generally indicated by line 3—3 of Fig. 2.
Figure 4:
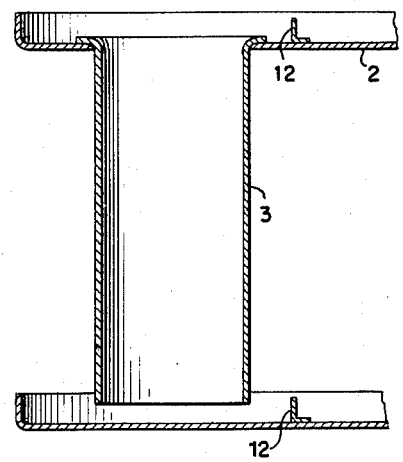
Fig. 4 is a vertical section taken along line 4—4 of Fig. 3.

Fig. 3 and Fig. 4 show certain details of the construction of a given plate and the downcomer which depends from that plate. In the embodiment shown in the drawings, each tray is a perforated plate having a great many holes 11, of which only a few are shown in Fig. 3, Vapor passes upwardly through these holes when the tower is being operated. Each tray is also provided with conventional weirs 12 which serve to maintain a level of liquid on the tray through which the vapor passes upwardly, thereby providing for intimate contact between the descending liquid and the ascending vapor.

Figure 9:
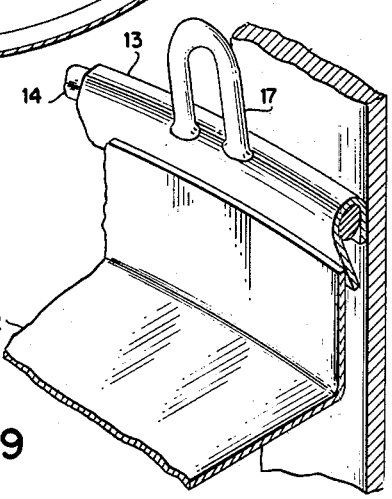
Fig. 9 is a detailed view showing a means whereby the sealing device can be removed when it is desired to dismantle the column.

Fig. 5, Fig. 6 and Fig. 7 show details of the sealing means of this invention. This means comprises a flexible metal strip 13 which is folded into the shape of a wedge over rod 14. Each wedge and associated rod has a length substantially equal to one-quarter the internal circumference of the shell 1 so that for each tray four wedges 13 and associated rods 14 are required to provide the desired seal between the tray and the shell. A given section of flexbile metal strip and associated rod is fabricated by first folding the metal strip over the rod and then forming the combination of the strip and rod so that the combination has a curvature which is approximately equal to that of the shell. Once an associated metal strip and rod have the proper curvature, they can be conveniently put into their proper position in the column by gently tapping them into place. The metal strip 13 with the rod 14 inside, after having been placed in position in the column, is held there by means of clamps 15. Eight clamps spaced equally about the circumference of each tray are employed in association with each tray, with every other clamp around the circumference being positioned above the places where the ends of the strips 13 meet each other, as indicated by the dotted lines in Fig. 5. Each clamp is provided with nut and bolt means 16 which can be tightened in order to hold the flexible strips 13 in place in the space between the shell and the tray. To facilitate withdrawal of the flexible strips and associated rods in disassembling the column, two lift lugs 17 (Fig. 9) are welded to the tops of each flexible strip at convenient locations.

Fig. 2, Fig. 5 and Fig. 8 show the manner in which the various plates are supported. Below the lowermost tray in the column there is provided a bridge made of three girders 18 which are welded at their ends to the shell 1 (Fig. 5). These girders support posts 19 which in turn support the trays. Each bridge is made up of three girders placed in parallel. There are fifteen posts 19. Each can be seen by Fig. 3, the middle girder, passing through the center of the column, supports five posts. Each of the other girders supports four posts, and the two remaining posts are supported by brackets 20 (Fig. 2) welded to the interior of the shell. A similar bridge arrangement is provided at the bottom of the upper section of the column above the joint 21.

A typical tower of the type just described has a total height of 80 feet and a diameter of 6 feet. Each tray is 0.109 inch thick and is made of stainless steel. The strips 13 are 0.0625 inch thick and the rods 14 are one-quarter inch in diameter, the strips and rods also being made of stainless steel.

We claim:
1. In a contact apparatus wherein one material phase is contacted with a different material phase whereby mass transfer between the phases takes place, the apparatus comprising a vertically positioned cylindrical vessel provided with a plurality of horizontal plates of external diameter slightly smaller than the internal diameter of the vessel, the improvement for sealing the space between a plate and the vessel which comprises a flexible metallic strip folded in its long direction over a rod whereby an elongated wedge is formed, the wedge being positioned with its thin edge pointing downwardly and with one of its faces in contact with the interior of the vessel and with the other of its faces in contact with the outer rim of the plate whereby passage of material between the inner wall of the vessel and the outer edge of the plate is blocked, and means urging the wedge downwardly into the space between the vessel and the outer rim of the plate whereby the wedge is maintained in position.

2. The apparatus of claim 1 wherein said means is an angle positioned with one side horizontal and the other side vertical and extending downwardly from said horizontal side, the lower face of the horizontal side being in contact with the upper face of said plate, and nut and bolt means extending through the horizontal side of the angle and the plate.

References Cited in the file of this patent

UNITED STATES PATENTS

| 2,201,949 | Wentworth | May 21, 1940 |
| 2,807,451 | Kuhni | Sept. 24, 1957 |
| 2,841,421 | Heere | July 1, 1958 |

FOREIGN PATENTS

| 253,469 | Switzerland | Nov. 16, 1948 |
| 891,411 | France | Dec. 11, 1943 |